United States Patent [19] [11] 4,254,966
Mitchell [45] Mar. 10, 1981

[54] ARRANGEMENT FOR COUPLING VEHICLES

[76] Inventor: David C. Mitchell, chemin des Rasses, 1255 Veyrier, Geneva, Switzerland

[21] Appl. No.: 55,134

[22] Filed: Jul. 5, 1979

[30] Foreign Application Priority Data

Jul. 5, 1978 [GB] United Kingdom ............... 28894/78

[51] Int. Cl.³ ............................................. B60D 1/02
[52] U.S. Cl. ................................ 280/405 R; 280/489; 280/492
[58] Field of Search ............... 280/492, 493, 494, 483, 280/485, 489, 405 R, 405 A, 405 B, 406 R, 406 A

[56] References Cited

U.S. PATENT DOCUMENTS

| | | | |
|---|---|---|---|
| 2,163,999 | 6/1936 | Jacks | 280/492 |
| 2,883,208 | 4/1959 | Hamblin | 280/405 B |
| 3,037,791 | 6/1962 | Travis | 280/405 B |
| 3,048,286 | 8/1962 | Sprague | 280/492 |
| 3,096,998 | 7/1963 | Stadelman | 280/405 B |
| 3,244,435 | 4/1966 | Weiss | 280/485 |
| 3,692,331 | 9/1972 | Vegors | 280/405 R |

Primary Examiner—John J. Love
Assistant Examiner—Donn McGiehan
Attorney, Agent, or Firm—Steele, Gould & Fried

[57] ABSTRACT

In this arrangement, the pitching, rolling and steering movements that take place between a motor car and a trailer are separately accommodated, with the pitching movements being accommodated by a horizontal transverse hinge structure arranged to be nearest the towing vehicle and comprising two relatively moving parts, motion therebetween occurring through an elastic member. A device is provided for stressing the elastic member in a variable and controlled manner whereby weight may be taken off the rear axle of the car to a desired extent and distributed to the front axle of the car and to the trailer axle. The rolling movements are accommodated by a stub-shaft at the front of the trailer, rotatably inserted into a longitudinally extending horizontal hole provided in the second of the above moving parts, and the steering movements are accommodated by an eye at the rear end of the stub-shaft, pivotally engaged in a fork-like member, carried by the trailer towbar, for motion about a vertical axis.

7 Claims, 5 Drawing Figures

ARRANGEMENT FOR COUPLING VEHICLES

BACKGROUND AND SUMMARY OF THE INVENTION

This invention relates to an arrangement for coupling a towed vehicle, e.g. a caravan, and a towing vehicle, e.g. a motor car.

The most commonly used coupling arrangement between a motor car and a trailer comprises a ball and socket joint, i.e. a spherical articulation, located well behind the rear axle of the car. These known coupling arrangements are convenient because the ball and socket joint, as a result of its universality, allows pitching motion about a horizontal transverse axis, allows rolling motion about a horizontal longitudinal axis and allows steering motion about a vertical axis. But the ball and socket joint also suffers from certain drawbacks.

In particular, the part of the trailer weight acting on the ball and socket joint (a) is largely borne by the rear axle of the car and (b) tends by leverage to lift the front end of the car thereby transferring weight from the front axle to the rear axle of the car. The rear axle can thus be easily overloaded, particularly with a full complement of passengers and a full trunk. Further, the handling of a motor car is generally adversely affected if the rear end of the motor car is depressed below the normal level running attitude as a result of extra loads imposed upon, or behind, its rear axle. Certain motor cars have "self-levelling" suspension systems whereby the rear of a motor car, when depressed, may be automatically raised to return the motor car to the correct, level, attitude. However, this refinement is not normally found on the cheaper makes of motor car. It operates by stiffening the sprung suspension system for the rear axle. But thus increasing the stiffness of the rear axle springing system does not however restore any weight that may have been lost from the front axle.

To overcome the above problem, the invention provides an arrangement for coupling a towed vehicle to a towing vehicle, wherein the pitching, rolling and steering movements that take place between the two vehicles are separately accommodated, and wherein said pitching movements are accommodated by a substantially horizontal, transverse hinge structure disposed nearest the towing vehicle, said hinge structure comprising first and second parts adapted to rotate relative to one another with said first part being positionally fixed relative to the towing vehicle and rotatably carrying the second part, motion between said two parts being transmitted by elastic means, means being provided for adjustably stressing the elastic means to bias said two parts into a desired angular relationship.

The elastic means, which may for instance comprise a rubber bush or a torsion bar, serve to resist motion between the two parts such as to provide a semblance of rigidity between the towing vehicle and the towed vehicle, thereby helping to distribute part of the added weight applied on the coupling to the front axle of the towing vehicle, and to the axle of the towed vehicle, while allowing for movements caused by road surface irregularities or driving onto or off ramps, and providing a sprung cushioning effect against shock loads.

The resulting improved weight distribution also enables the coupling to carry more weight. This makes it possible to move the center of gravity of the towed vehicle forwards or the axle of the latter backwards, and hence to overcome to an appreciable extent, it is believed, the problem of "snaking", i.e. the tendency for the towed vehicle to sway sideways and to follow a serpentine course.

By applying torsional force to the elastic means about the pitching movements axis the elastic means can be stressed in an adjustable manner to relieve the rear axle of the towing vehicle to a greater or lesser extent, the weight taken off the rear axle being shifted to the front axle of the towing vehicle and to the axle of the trailer.

Preferably, the second part comprises a hole for rotatably receiving a stub-shaft, carried by the towed vehicle, along the rolling movements axis to form a second hinge structure for accommodating said rolling movements, means being provided for releasably locking the stub-shaft in the hole against axial movement therein.

Preferably also, the stub-shaft is mounted at the front of the towed vehicle for angular motion about a third substantially vertical, hinge structure to accommodate said steering movements. In one form of construction, the stub-shaft comprises an eye pivotally mounted in a fork-like member.

By separately accommodating the pitching, rolling and steering movements that take place between a towed vehicle and a towing vehicle, by means of three separate hinge structures, it is then also possible to control the action of the three hinge structures separately.

BRIEF DESCRIPTION OF THE DRAWINGS

In the accompanying diagrammatic drawings, given by way of example.

DETAILED DESCRIPTION OF THE PREFERRED EMBODIMENTS

Figure 1:
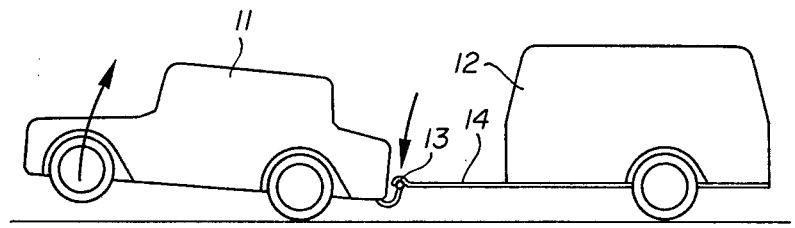
FIGS. 1 and 2 are two side views of a motor car and trailer which serve to illustrate the problems which the invention overcomes.

In the diagrammatic view of FIG. 1, a motor car 11 and a trailer 12 are shown connected by a hinged coupling 13. The weight imposed by the trailer drawbar 14 on the coupling 13, which is placed behind the rear axle of the motor car 11, is shown to cause the front axle of the motor car to be urged upwards.

Figure 2:
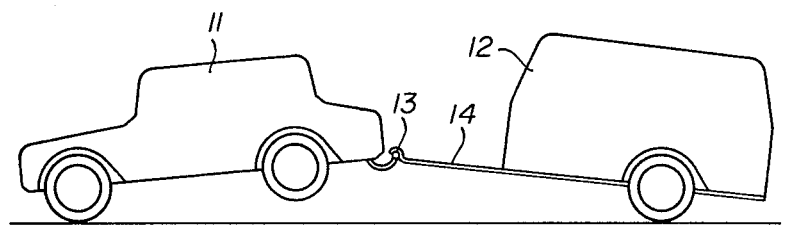

In FIG. 2 the motor car 11 is assumed to be connected to the trailer 12 by a coupling 13 which has been made rigid in a position such that the rear axle of the motor car 11 is held clear of the ground so that the combined weight of the motor car and the trailer is distributed between the front axle of the motor car and the axle of the trailer. This would be possible because of the elimination of the "hinge effect" of the coupling. A welded connection is however quite impracticable.

Figure 3:
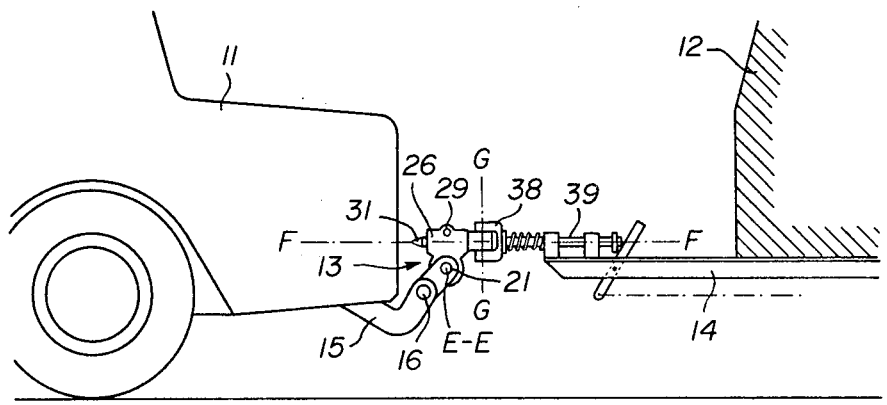
FIG. 3 is a side view of part of a motor car and part of a trailer, connected by one form of embodiment of the coupling arrangement according to the invention.

The coupling 13 shown in FIG. 3 is partly mounted on the forward part of the structure of a trailer 14 and partly on brackets 15 fast with the structure of a motor car 11. The brackets 15 carry, and are fast with the ends of, a fixed tubular cross member 16 placed transversely at the back of the motor car at a convenient distance behind the rear-most part thereof. FIG. 3 also shows diagrammatically an arrangement for an overrun brake system, well known to those versed in the art.

Figure 4:
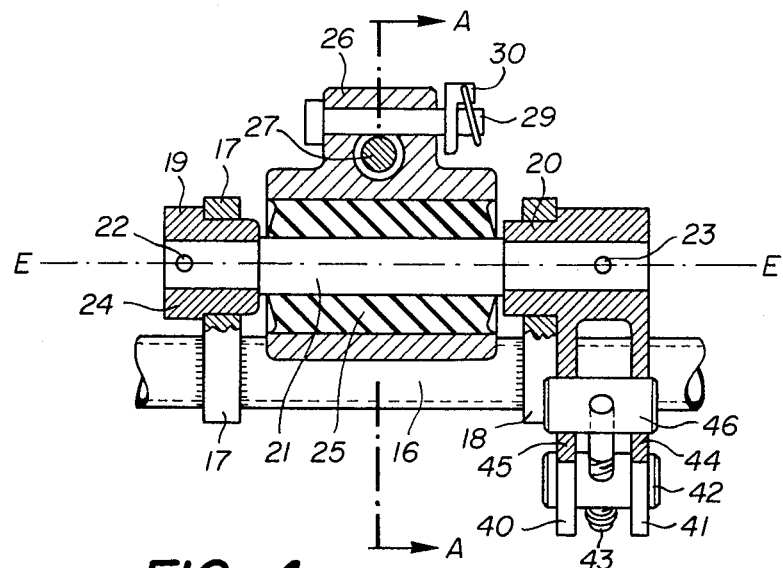
FIGS. 4 and 5 illustrate in greater detail the coupling arrangement shown in FIG. 3, FIG. 4 being a section on line B—B of FIG. 5, and FIG. 5 being a section on line A—A of FIG. 4.
Figure 5:
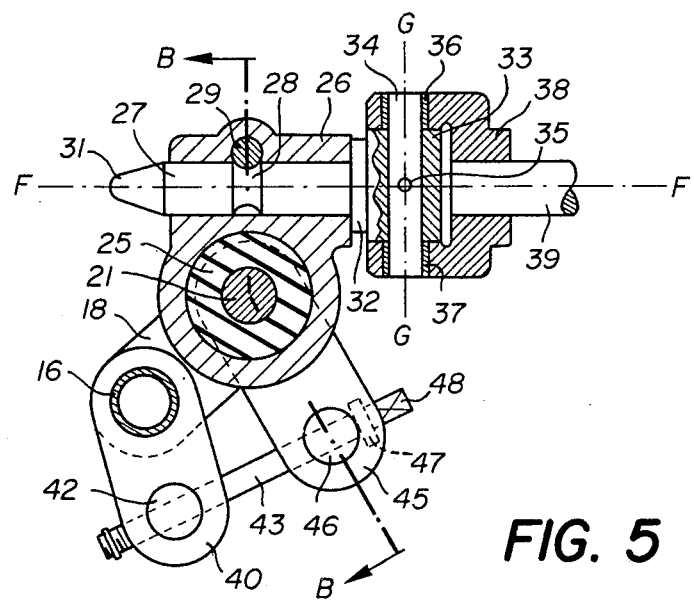

As more clearly indicated in FIGS. 4 and 5, the cross member 16 has two brackets, 17 and 18, rigidly attached thereto and having at their free ends coaxial holes in which are rotatably mounted bearings 19 and 20 carrying between them a shaft 21 which lies parallel to cross member 16 at a distance therefrom. Bearings 19 and 20 are respectively attached to shaft 21 by pins or dowels 22 and 23. Bearings 19 and 20 respectively have shoulder-forming increased diameter portions 24. Thus when shaft 21 and the bearings 19 and 20 are assembled with the pins 22 and 23, the shaft is axially located in relation to the brackets 17 and 18. An annular bush 25, of rubber or other suitable elastic material, is bonded on the inside to the shaft 21 and on the outside to the surface of a bore extending through a casting or like member 26. Because of the elastic nature of bush 25, limited angular movement may occur between the shaft 21 and the casting 26. Thus, if the shaft 21 is rotated in relation to the brackets 17 and 18, the casting 26 will be urged to rotate in like manner or, if the casting 26 is prevented from rotating through the same angle as shaft 21, a torsional biassing force will be applied on the casting 26 by the elastic material of the bush 25.

The casting 26 has a second bore in which is slidably mounted a stub-shaft 27 having its axis F—F at right angles to the axis E—E of shaft 21, and spaced away from same. The stub-shaft 27 has a peripheral groove 28 which can be engaged by a pin 29 extending at right angles through the casting 26. The pin 29 prevents axial movement of stub-shaft 27 but permits free rotary movement thereof. The pin 29 is formed with a shoulder at one end and is provided at its other end with a slot or hole to receive a cotter and spring ring 30 in the usual manner to prevent undesired axial displacement of the pin. The free end 31 of stub-shaft 27 is tapered to facilitate its entry into the longitudinal bore in casting 26 along axis F—F. At the end of the stub-shaft 27 remote from its tapered end 31, a shoulder 32 limits entry of the stub-shaft into casting 26 to locate the groove 28 ready to receive the pin 29. Adjacent shoulder 32, the stub-shaft is provided with an eye 33 which is pivotally mounted in a fork-like member 38 by means of a normally vertical pin 34 extending at right angles to axes E—E and F—F. Pin 34 is axially located and prevented from rotation in eye 33 by a pin or dowel 35 extending through the eye. The fork-like member 38 has bearings 36 and 37 which can rotate around the pin 34. Fork-like member 38 is fast with a shaft 39 attached in non-rotatable manner (to assure verticality of steering axis) to the drawbar of the trailer 14 in the manner shown in FIG. 3 which is well known to those versed in the art.

As only shown in FIGS. 4 and 5, the cross member 16 carries a bifurcated member, fast with the cross member and having arms 40 and 41 carrying a pin 42, radially spaced from the cross member 16 and parallel thereto. Pin 42 can rotate in the holes made therefor in the arms 40 and 41 and is formed with a tapped hole, at right angles to its main axis, for receiving the threaded end of a rod 43.

Bearing 20 has two radially extending arms 44 and 45 which carry a pin 46 radially spaced from shaft 21 and parallel thereto. Pin 46 is rotatable in the arms 44 and 45 and is provided with a smooth hole, having its axis at right angles to its main axis, through which passes the upper unthreaded portion of rod 43 and against which bears a shoulder of increased diameter 47 formed on rod 43. The end portion 48 of rod 43, remote from its threaded end, is of square section to receive a spanner or lever with socket and ratchet head.

If the thread on rod 43 is engaged further within its mating threaded hole, the arms 44 and 45 of bearing 20 will be urged by pin 46 to move angularly towards stationary arms 40 and 41 since the latter are rigid with the unrotatable cross-member 16. Further, since bearing 20 is fastened by pin 23 to shaft 21, shaft 21 will rotate in similar fashion carrying with it the attached portion of the elastic bush 25 and either causing rotation of casting 26 or applying a torsional force on or stressing same.

As will be apparent from FIGS. 3 and 4, pitching movements between the motor car and the trailer can only take place and be accommodated around axis E—E, rolling motion can only take place around axis F—F, and motion due to steering can only take place around axis G—G. Thus, if a torsional force is applied by the elastic bush 25 to the casting 26 in a clockwise direction as viewed in FIG. 3, the drawbar 14 of the trailer 12 will also be urged angularly clockwise with the result that the rear end of car 11 tends to be lifted as illustrated in FIG. 2, so adding load to the trailer axle and to the front axle of the motor car. Though FIG. 2 illustrates the point by exageration and shows the motor car axle clear of the ground, this is an extreme case and the weight lifted off the rear axle of the motor car will be related to the torsional force exerted by the elastic bush 25. Further, if weight from the coupling point 13 is partly transferred to the axle of the trailer and partly transferred to the front axle of the motor car, the sum of such transferred weights will equal the weight removed from the rear axle of the motor car.

When it is required to disconnect the trailer from the motor car, the pin 29 is withdrawn from its engagement with the peripheral groove 28 in stub-shaft 27 whereupon stub-shaft 27 is withdrawn from the casting 25 so disconnecting the trailer from the motor car.

The above described and illustrated arrangement may be modified in various ways. For instance, elastic means other than a rubber bush may be used along the pitching axis of the coupling, for resisting angular movement between the relatively moving parts, e.g. 21 and 26, of the coupling or for applying a torsional force by one part, e.g. 21, to the other, e.g. 26, around the pitching axis of the coupling whereby more than gravity weight can be imposed on the trailer axle and on the front axle of the motor car. One such elastic means may consist of a torsion bar fastened at its ends to bearings similar to bearings 19 and 20, and along its middle portion to a casting similar to casting 26.

I claim:

1. An arrangement for coupling a towed vehicle to a towing vehicle, wherein movements about the pitching, rolling and steering axes are separately accommodated, comprising:

a substantially horizontal, transverse hinge structure, having first and second parts, disposed nearest the towing vehicle for accommodating said pitching movement, said first and second parts being adapted to rotate relatively to one another with said first part being positionally fixed relative to the towing vehicle and rotatably carrying said second part;

elastic means for transmitting motion between said two parts; and, means for adjustably stressing the elastic means to bias said two parts into a desired angular relationship.

2. The coupling arrangement of claim 1, further comprising a pivotal assembly rotatably mounted on said first part, said second part being rotatably mounted on said assembly along the pitching movements axis, said elastic means being disposed between and secured to said second part and said pivotal assembly, and said stressing means being disposed on said pivotal assembly and said first part for applying a variable and controlled torsional force to the elastic means about the pitching movements axis.

3. The coupling arrangement of claim 1, wherein said stressing means comprises:

lever arms on said pivotal assembly and on said first part; and, means mounted on said lever arms for adjustably varying the distance between said arms.

4. The coupling arrangement of claim 1, further comprising a substantially vertical hinge structure disposed nearest the towed vehicle, for accommodating said steering movements.

5. The coupling arrangement of claim 1 or 2, further comprising: a stub-shaft, adapted to be carried by the towed vehicle, along the rolling movements axis, said second part having a hole for rotatably receiving the stub-shaft, to form a second substantially horizontal hinge structure for accommodating said rolling movements; and, means for releasably locking the stub-shaft in the hole against axial movement therein.

6. The coupling arrangement of claim 5, wherein the stub-shaft is mounted at the front of the towed vehicle for motion about a third substantially vertical, hinge structure to accommodate said steering movements.

7. The coupling arrangement of claim 6, wherein said third hinge structure comprises a fork-like member and said stub-shaft includes an eye pivotally mounted in the fork-like member.

* * * * *